Patented Sept. 21, 1954

2,689,800

UNITED STATES PATENT OFFICE 2,689,800

SOLUTION FOR COATING FILMS OF LOWER ALIPHATIC ACID ESTER OF CELLULOSE, A PROCESS OF COATING SAID FILMS THEREWITH, AND THE COATED FILM

William B. Horback, Irvington, and Gregory M. Moelter, Basking Ridge, N. J., assignors to Celanese Corporation of America, New York, N. Y., a corporation of Delaware No Drawing. Application March 15, 1951,
Serial No. 215,852

20 Claims. (Cl. 106—186)

This invention relates to the preparation of films and relates more particularly to the preparation of lower aliphatic acid ester of cellulose films having moistureproof and/or heat-sealable coatings thereon.

Films made from lower aliphatic acid esters of cellulose, particularly cellulose acetate, have found extensive use as wrapping materials and for many related purposes. These cellulose acetate films are relatively permeable to water vapor and are, therefore, not suited for use as wrapping materials where the films themselves must function as a barrier to the passage of water vapor. In addition, the cellulose acetate films are heat-sealable only with difficulty under specialized conditions and are, therefore, not capable of being used on packaging machinery which employs heat sealing mechanisms in the production of the package. It has previously been proposed to apply a moistureproof and/or heat-sealable coating to one or both surfaces of the cellulose acetate films to lower the permeability of these films and to permit the films to be readily heat sealed. However, the moistureproof and/or heat-sealable coatings heretofore suggested for this purpose have been deficient in one or more respects and cellulose acetate films coated therewith have, accordingly, not come into widespread commercial use.

It is an important object of this invention to provide lower aliphatic acid ester of cellulose films having moistureproof and/or heat-sealable coatings thereon which will be free from the difficulties previously experienced with these films and solutions for coating said films.

A further object of this invention is to provide lower aliphatic acid ester of cellulose films, particularly cellulose acetate films, having moistureproof coatings thereon whose properties will render them acceptable for commercial use.

Another object of this invention is to provide lower aliphatic acid ester of cellulose films, particularly cellulose acetate films, having heat-sealable coatings thereon.

Other objects of this invention will be apparent from the following detailed description and claims.

According to the present invention, there is applied to one or both surfaces of cellulose acetate or other lower aliphatic acid ester of cellulose films, a moistureproof and heat-sealable coating composition containing cellulose nitrate, a wax such as a natural wax or a synthetic wax or a blend of the two, a plasticizer and a polyamide of a polyfunctional amine and a polyfunctional polymeric unsaturated higher fat acid or amide-forming derivative of such acid. The cellulose acetate films coated with said coating composition not only have a low permeability to the passage of water vapor, but are also readily heat-sealable and exhibit good slip to the heat-sealing elements. The coated films also have a good gloss, and are clear, non-blocking and free from tackiness, during handling and at high temperatures and humidities. The coatings themselves adhere firmly to the cellulose acetate films and remain clear even when immersed in water. In addition, the coated films age well and retain their properties over long periods of time. If it is desired simply to provide the cellulose acetate films with a heat-sealable coating without materially altering their permeability to water vapor, the wax may be eliminated entirely from the coating composition. However, even in this case, it is advantageous to include a small amount of wax in the coating composition to improve the slip of the coated films with respect to the heat-sealing elements.

The polyamides employed for producing our novel coatings on cellulose acetate films are the thermoplastic reaction products of a polyfunctional amine such as ethylene diamine, 1,6-hexamethylene diamine, and the like, with a polyfunctional dimeric or higher polymeric unsaturated higher fat acid, or amide-forming derivative of such acid, such as an ester, derivable from vegetable oils such as, for example soybean and linseed oil. The production of these polyamides is described in detail in "Oil and Soap," vol. 21, pp. 101–107 (1944). A typical polyamide prepared by the reaction of ethylene diamine with the dimerized and trimerized linoleic and linolenic acids of soybean oil has a molecular weight of 6000 to 9000, a ball and ring softening point (ASTM) of 105 to 115° C., a penetration of 7 at 25° C. (ASTM-200 gram weight), a Gardner-Holdt viscosity of B to D as 35% solids in equal parts of toluene and n-butanol, and a viscosity of 65 to 100 centipoises.

Coated cellulose acetate films having the most desirable properties are obtained when the coating composition contains from about 30 to 65% by weight of the polyamide, from about 0 to 10% by weight or preferably from about 2 to 10% by weight of the wax, from about 15 to 40% by weight of cellulose nitrate, and from about 5 to 25% by weight of a plasticizer. The cellulose nitrate employed in this coating composition preferably has a viscosity of between about 0.5 and 25 seconds. Examples of suitable plasticizers that may be incorporated in the coating composition include dibutyl phthalate, tricresyl phosphate, dibutyl sebacate mixtures of o- and p-ethyl toluene sulfonamide, castor oil and its derivatives, rosin esters, and other resinous plasticizers. The properties of the coating composition may be modified somewhat by the inclusion therein of up to about 10% by weight of a resin compatible therewith such as, for example, the modified phenol-formaldehyde resins, the resins formed by the condensation of toluol sulfonamides with formaldehyde, the rosin derivative resins, the pentaerythritol esters of rosins, alkyd resins, vinyl resins and acrylic resins.

In coating the cellulose acetate films, the coating composition should be dissolved in a solvent or solvent mixture having little or no effect on cellulose acetate to avoid distorting or wrinkling the films. It has been found that a solvent mixture containing from about 35 to 65% by weight of a hydrocarbon including from about 0 to 30% of an aliphatic hydrocarbon having a boiling point above about 60° C. or preferably between about 65 and 130° C., such as petroleum naphthas and the like, and from about 25 to 35% by weight of an aromatic hydrocarbon having a boiling point above about 80° C. or preferably between about 80 and 138° C., such as toluene and the like; together with from about 20 to 35% by weight of a ketone having a boiling point above about 100° C. or preferably between about 100 and 127° C. such as hexone and the like, and from about 15 to 30% by weight of an alcohol having a boiling point above about 80° C. or preferably between about 80 and 127° C. such as isopropanol and the like will have little or no effect on the cellulose acetate films and will dissolve large quantities of the coating composition. The solids content of the solution containing the coating composition may range from about 10 to 25% by weight.

The present invention will now be described in connection with the coating of cellulose acetate films, which are commercially the most important lower aliphatic acid ester of cellulose films at the present time. Other lower aliphatic acid esters of cellulose films which may be employed in place of cellulose acetate films include cellulose propionate, cellulose butyrate, cellulose acetate propionate and cellulose acetate butyrate films.

The following example is given to illustrate this invention further.

Example

A coating composition containing 54% by weight of a polyamide prepared by the reaction of ethylene diamine with the dimerized and trimerized linoleic and linolenic acids of soybean oil, 27% by weight of a 0.5 second cellulose nitrate, 13.6% by weight of dibutyl phthalate and 5.4% by weight of paraffin wax having a melting point of 151° F. (ASTM D87-42) is dissolved in a solvent mixture containing 26.3% by weight of textile spirits (petroleum naphtha distilling between 60 and 99° C.), 25.4% by weight of hexone, 18.6% by weight of isopropyl alcohol, 27.6% by weight of toluene, and 2.1% by weight of butanol. The solution is filtered and coated onto both sides of a cellulose acetate film 0.001 inch thick and the film is dried. The coating on the cellulose acetate film is 0.00005 to 0.0001 inch thick and the coated film has a permeability to water vapor of only 7 grams/square meter/24 hours at a pressure differential of 20 mm. mercury. In addition, the coated film produces a very good heat seal at 250 to 280° C. and slips readily over the heat-sealing elements.

The coated film also has a good gloss, is clear and exhibits no tendency to block or develop tackiness when handled or when stored under a pressure of 1 pound per square inch for 24 hours at 110° F., or for 48 hours at 77° F. and 95% relative humidity. On immersion in water at room temperature for 24 hours the coating remains clear and exhibits no tendency to peel away from the film. The properties of the film do not change appreciably upon ageing for extended periods of time.

It is to be understood that the foregoing detailed description is given merely by way of illustration and that many variations may be made therein without departing from the spirit of our invention.

Having described our invention, what we desire to secure by Letters Patent is:

1. Lower aliphatic acid ester of cellulose films having thereon a coating comprising cellulose nitrate, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

2. Lower aliphatic acid ester of cellulose films having thereon a coating comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

3. Lower aliphatic acid ester of cellulose films having thereon a coating comprising from about 15 to 40% by weight of cellulose nitrate, up to 10% by weight of a wax, from about 5 to 25% by weight of a plasticizer, and from about 30 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

4. Lower aliphatic acid ester of cellulose films having thereon a coating comprising cellulose nitrate, paraffin wax, dibutyl phthalate, and a polyamide of ethylene diamine and the dimerized and trimerized unsaturated higher fat acids of soybean oil said polyamide having a molecular weight of from 6000 to 9000 and a ball and ring softening point of 105 to 115° C.

5. A cellulose acetate film having thereon a coating comprising cellulose nitrate, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

6. A cellulose acetate film having thereon a coating comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

7. A cellulose acetate film having thereon a coating comprising from about 15 to 40% by weight of cellulose nitrate, up to 10% by weight of a wax, from about 5 to 25% by weight of a plasticizer, and from about 30 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C.

8. Process for coating lower aliphatic acid ester of cellulose films which comprises applying to said films a coating composition comprising cellulose nitrate, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C. dissolved in a solvent mixture comprising a hydrocarbon, a ketone and an alcohol.

9. Process for coating lower aliphatic acid ester of cellulose films which comprises applying to said films a coating composition comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising a hydrocarbon, a ketone and an alcohol.

10. Process for coating lower aliphatic acid ester of cellulose films which comprises applying to said films a coating composition comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point above about 60° C., an aromatic hydrocarbon having a boiling point above about 80° C., a ketone having a boiling point above about 100° C. and an alcohol having a boiling point above about 80° C.

11. Process for coating lower aliphatic acid ester of cellulose films which comprises applying to said films a coating composition comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point between about 65 and 130° C., an aromatic hydrocarbon having a boiling point between about 80 and 138° C., a ketone having a boiling point between about 100 and 127° C., and an alcohol having a boiling point between about 80 and 127° C.

12. Process for coating lower aliphatic acid ester of cellulose films which comprises applying to said films a coating composition comprising from about 15 to 40% by weight of cellulose nitrate, up to 10% by weight of a wax, from about 5 to 25% by weight of a plasticizer, and from about 30 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising a hydrocarbon, a ketone and an alcohol.

13. Process for coating lower aliphatic acid ester of cellulose films which comprises applying to said films a coating composition comprising from about 15 to 40% by weight of cellulose nitrate, up to 10% by weight of a wax, from about 5 to 25% by weight of a plasticizer, and from about 30 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point between about 65 and 130° C., an aromatic hydrocarbon having a boiling point between about 80 and 138° C., a ketone having a boiling point between about 100 and 127° C., and an alcohol having a boiling point between about 80 and 127° C.

14. Process for coating cellulose acetate films which comprises applying to said films a coating composition comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising a hydrocarbon, a ketone and an alcohol.

15. Process for coating cellulose acetate films which comprises applying to said films a coating composition comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point above about 60° C., an aromatic hydrocarbon having a boiling point above about 80° C., a ketone having a boiling point above about 100° C., and an alcohol having a boiling point above about 80° C.

16. Process for coating cellulose acetate films which comprises applying to said films a coating composition comprising from about 15 to 40% by weight of cellulose nitrate, up to 10% by weight of a wax, from about 5 to 25% by weight of a plasticizer, and from about 30 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point between about 65 and 130° C., an aromatic hydrocarbon having a boiling point between about 80 and 138° C., a ketone having a boiling point between about 100 and 127° C., and an alcohol having a boiling point between about 80 and 127° C.

17. A solution for coating lower aliphatic acid ester of cellulose films comprising cellulose nitrate, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C. dissolved in a solvent mixture comprising a hydrocarbon, a ketone and an alcohol.

18. A solution for coating lower aliphatic acid ester of cellulose films comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising a hydrocarbon, a ketone and an alcohol.

19. A solution for coating lower aliphatic acid ester of cellulose films comprising cellulose nitrate, a wax, a plasticizer, and a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point above about 60° C., an aromatic hydrocarbon having a boiling point above about 80° C., a ketone having a boiling point above about 100° C., and an alcohol having a boiling point above about 80° C.

20. A solution for coating lower aliphatic acid ester of cellulose films comprising from about 15 to 40% by weight of cellulose nitrate, up to 10% by weight of a wax, from about 5 to 25% by weight of a plasticizer and from about 35 to 65% by weight of a thermoplastic polyamide of ethylene diamine and a member of a group consisting of dimerized and trimerized linoleic and linolenic acids, said polyamide having a molecular weight of from 6000 to 9000 and a ball and ring softening point of 105 to 115° C., dissolved in a solvent mixture comprising an aliphatic hydrocarbon having a boiling point between about 65 and 130° C., an aromatic hydrocarbon having a boiling point between about 80 and 138° C., a ketone having a boiling point between about 100 and 127° C. and an alcohol having a boiling point between about 80 and 127° C.

References Cited in the file of this patent

UNITED STATES PATENTS

| Number | Name | Date |
| --- | --- | --- |
| 1,997,857 | Charch | Apr. 16, 1935 |
| 2,192,955 | Sloan et al. | Mar. 12, 1940 |
| 2,379,413 | Bradley | July 3, 1945 |
| 2,517,754 | Young et al. | Aug. 8, 1950 |
| 2,555,111 | Bradley | May 29, 1951 |

OTHER REFERENCES

Cowan et al.: "Norelac" etc. Oil and Soap 21, 1944, pages 101–107.